Feb. 25, 1958 E. R. NIELSEN 2,824,468
SAW SHARPENER

Filed July 26, 1956 3 Sheets-Sheet 1

INVENTOR.
Erich R. Nielsen
BY Webster & Webster
ATTYS.

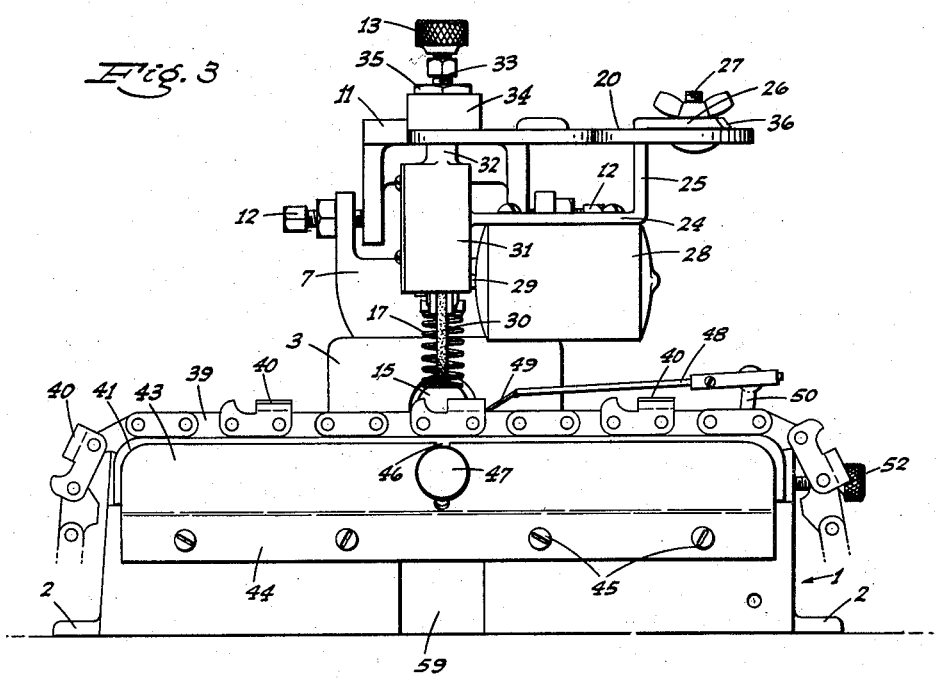
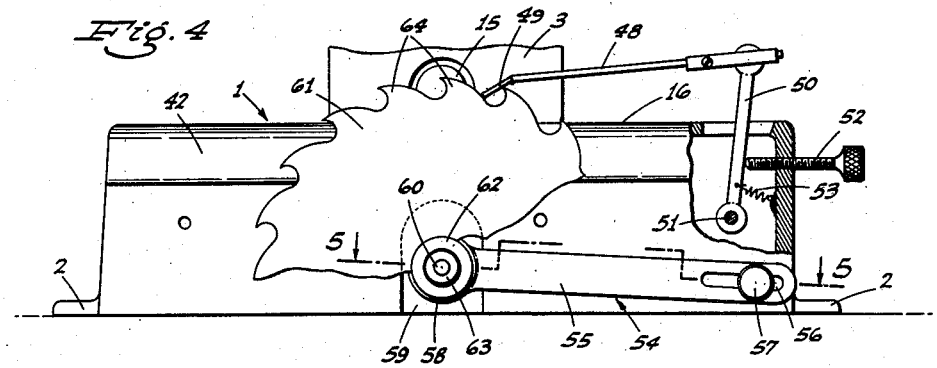
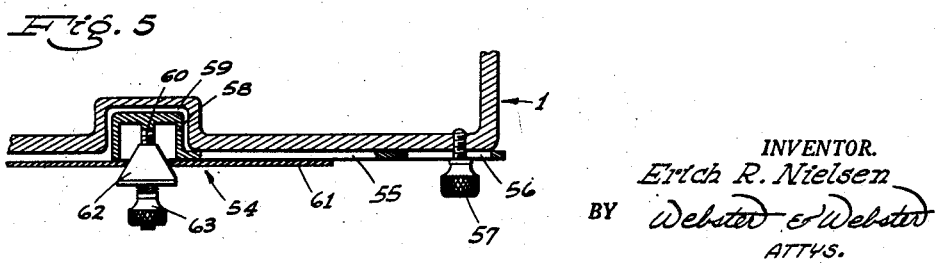
INVENTOR.
Erich R. Nielsen
BY Webster & Webster
ATTYS.

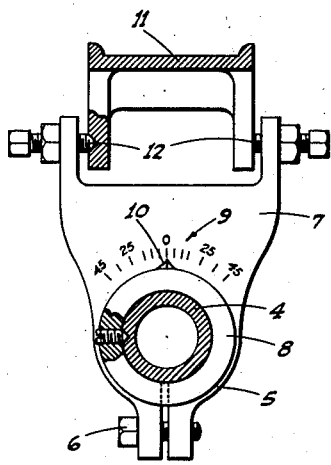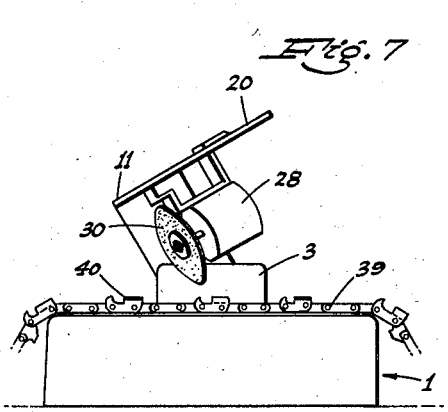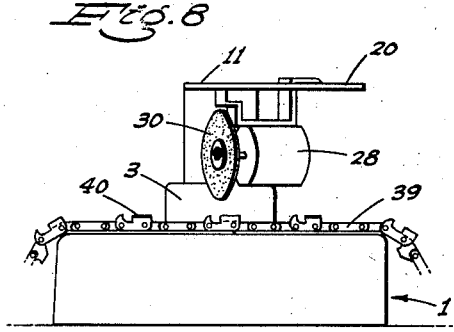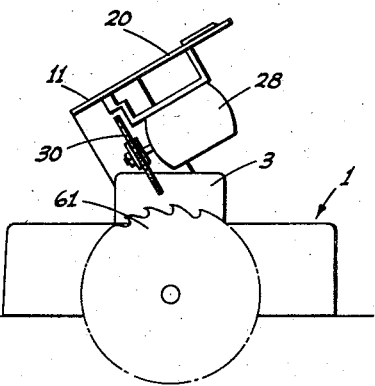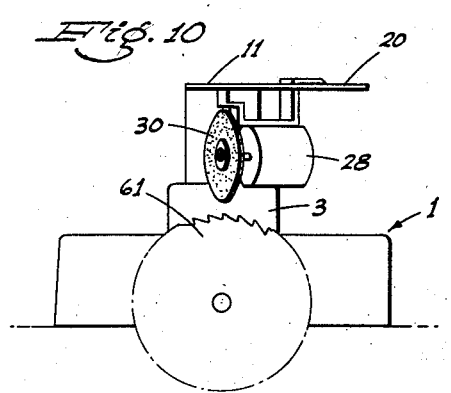

United States Patent Office 2,824,468
Patented Feb. 25, 1958

2,824,468
SAW SHARPENER
Erich R. Nielsen, Stockton, Calif.
Application July 26, 1956, Serial No. 600,223
13 Claims. (Cl. 76—40)

This invention is directed to, and it is a major object to provide, a novel bench-mounted electric motor-driven saw sharpener; the device being especially designed—but not limited—for use to sharpen chain saws and circular saws.

Another important object of the invention is to provide a saw sharpener which includes a novel manually operated swing arm which carries an electric motor and grinding wheel unit for spring-resisted downward motion between an initially raised or clearance position and a lowered or working position with the grinding wheel in sharpening engagement with one tooth of a saw clamped in a fixed position on the device.

Another important object of the invention is to provide a saw sharpener, as in the preceding paragraph, wherein the electric motor and grinding wheel unit is selectively and independently adjustable to preset the grinding wheel to sharpen a saw tooth to a desired angle transversely, or pitch longitudinally, or both.

A further object of the invention is to provide a saw sharpener, as above, wherein a novel stop device is employed to limit the depth of cut by the grinding wheel on each tooth as the swing arm is moved downwardly; such stop device being arranged in assembly with the spring means which yieldably resists such downward motion of the swing arm and the electric motor and grinding wheel unit thereon, and so that said stop and spring means are effective in any adjusted position of said unit.

It is also an object of the invention to provide a saw sharpener which is designed for ease and economy of manufacture, convenience of use, and the accurate sharpening of the teeth of a saw.

Still another object of the invention is to provide a practical, reliable, and durable saw sharpener, and one which will be exceedingly effective for the purpose for which it is designed.

These objects are accomplished by means of such structure and relative arrangement of parts as will fully appear by a perusal of the following specification and claims.

Figure 1:
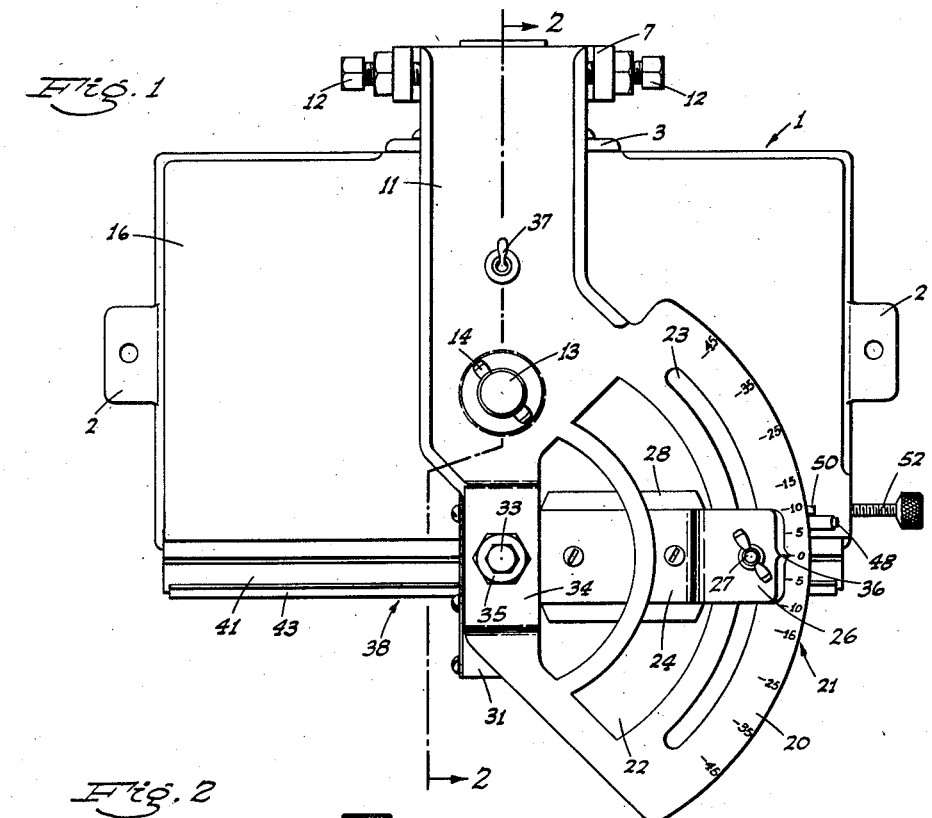
Figure 2:
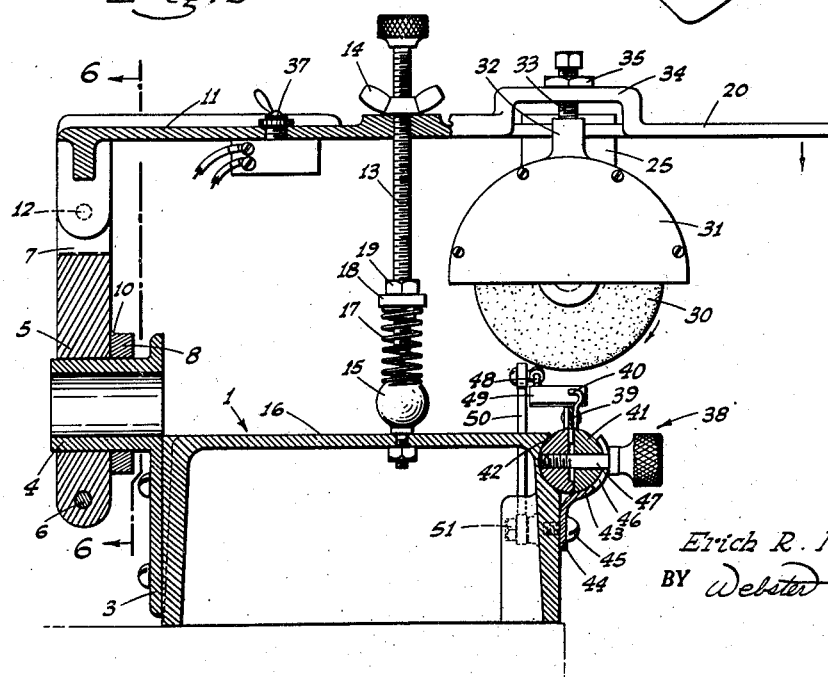

In the drawings:
Fig. 1 is a top plan view of the saw sharpener.
Fig. 2 is a transverse elevation, partly in section, taken on line 2—2 of Fig. 1.
Fig. 3 is a front elevation of the saw sharpener.
Figs. 1–3 inclusive show the device as including the clamping means for securing a chain saw on the device.
Fig. 4 is a fragmentary front elevation of the saw sharpener as modified to accept a circular saw.
Fig. 5 is a fragmentary sectional plan view on line 5—5 of Fig. 4.
Fig. 6 is a fragmentary sectional elevation taken on line 6—6 of Fig. 2.
Figs. 7–10 inclusive are diagrammatic elevations showing selective positions of adjustment of the electric motor and grinding wheel unit; Figs. 7 and 8 showing a chain saw on the device, while Figs. 9 and 10 show a circular saw.

Referring now more particularly to the drawings, and to the characters of reference marked thereon, and at present to Figs. 1, 2, 3, and 6, the saw sharpener comprises an upstanding, elongated, flat-topped base, indicated generally at 1, and which is of hollow form. Such base is formed at the ends with laterally projecting feet 2 used to attach the device to a bench or the like.

At the rear thereof the base 1 is fitted with an attachment flange 3 which projects above said base and is there formed with a rearwardly extending boss 4 which receives—in surrounding relation—a split collar 5 normally clamped on said boss by a bolt 6. The split collar 5 is formed integral with an upstanding bracket 7, while a ring 8 is secured on the boss 4 directly in front of such bracket 7; the face of the latter being scribed with a scale 9, as shown, and upon which scale a pointer 10 reads. The pointer 10 is formed on the top of the ring 8.

A generally vertically movable swing arm 11 extends transversely above the base 1 centrally of its ends, and such swing arm 11 is pivoted at its rear end, as at 12, in connection with the upper end of the bracket 7.

In order to normally but yieldably maintain the swing arm 11 in a substantially horizontal position, and to also limit the extent to which it may be swung downwardly, the following arrangement is employed:

An adjustable stop screw 13 is threaded through the swing arm 11 intermediate its ends, and such screw—which is normally locked in adjusted position by a wing nut 14—terminates at its lower end normally at a point adjacent but above a metallic ball 15 fixed in connection with—and upstanding from—the top 16 of the base 1.

A compression spring 17 seats at its lower end on the ball 15, surrounds the lower portion of the screw 13, and seats at the upper end against a washer 18, which in turn bears on a nut 19 carried by said screw 13.

With this arrangement the swing arm 11 can be swung down only until the stop screw 13 abuts the ball 15, which controls the depth of cut, as will hereinafter appear. Additionally, the spring 17 yieldably resists such downward motion of the swing arm 11 and normally maintains it in a horizontal position.

Because of the fact that the ball 15 is substantially alined with the axis of the boss 4, the above described stop screw and spring assembly function effectively even though the bracket 7 and the swing arm 11 carried thereby may have been adjusted about the rearwardly extending boss 4.

At the forward portion thereof, and laterally in one direction, the swing arm 11 is formed with an integral quadrant 20 scaled on the top and adjacent the periphery thereof, as at 21; the quadrant 20 inwardly of such scaled top being formed with concentric slots 22 and 23.

A supporting arm 24 is disposed beneath the quadrant 20 in spaced parallel relation, and at its outer end such arm is formed with an upturned portion 25 which extends through the slot 22; there being a horizontal, outwardly extending finger 26 on the upper end of the arm portion 25. Such finger 26 rests atop the quadrant 20 in spanning relation to the slot 23, and the finger and quadrant are secured together in adjustable relation by a wing nut bolt 27.

The arm 24 is fixed to the top of, and supports, an electric motor 28 in an intially horizontal position and with the motor shaft 29 extending longitudinally of the device; i. e., above and lengthwise of the forward upper corner or edge of the base 1.

A grinding wheel 30 is fixed to the motor shaft 29, and the upper half of such wheel is encompassed by a shield 31 fixed to the adjacent end of the arm 24. Also, such shield 31 is provided at the top with an integral boss 32 into which a suspension bolt 33 extends from above downwardly through an upwardly offset portion 34 of the swing arm 11; there being a lock nut 35 on bolt 33 bearing against the top of said offset portion 34.

With the described arrangement the electric motor 28 is effectively and rigidly supported from the swing arm 11, but can be adjusted about the bolt 33 as an axis by merely loosening said bolt, together with the bolt 27 and movement of the finger 26 along the quadrant 20 in one direction or the other from the central or zero point; said finger having a pointer 36 which reads on the scale 21.

The electric motor 28 is energized by a suitable circuit, which has been omitted for the sake of clarity but which includes an "on-off" switch 37 mounted on the swing arm 11.

With the electric motor 28 and the grinding wheel 30 so mounted in connection with the swing arm 11, such grinding wheel 30 lies in a position extending transversely of, and a distance above, the upper outer corner or edge of the base 1.

A saw clamping device, indicated generally at 38, is mounted on—and extends along—said upper and outer edge of the base 1; such clamping device 38, as in Figs. 1–3, inclusive—being adapted for the reception of the saw chain 39 of a chain type saw, and wherein the included teeth are indicated at 40.

The clamping device 38 comprises a horizontal or longitudinally extending clamping bar 41 which is split through diametrally from top to bottom, and which bar is carried at the back in a half-circle groove 42 formed in the face of the base 1, while the front of such bar is embraced by a longitudinal concave retention plate 43 which includes a depending flange 44 secured to such face of the base by screws 45.

Centrally of the ends thereof the retention plate 43 is formed with a vertical slot 46 through which a headed clamping screw 47 extends; such clamping screw running free through the outer half or section of the clamping bar 41, while being threaded into the inner half.

In order to support the saw chain 39 horizontally and in a straight-line position, the lower portion of such chain is engaged between the halves or sections of the clamping bar 41 and the latter are then brought into clamping engagement with the chain by tightening the screw 37.

If desired, the clamping screw 47 can be shifted upwardly or downwardly in the vertical slot 46, so as to dispose the saw chain 39 in an exact vertical position or canted laterally inwardly or outwardly, as sharpening conditions may require.

Before the clamping screw 47 is tightened, the saw chain 39 is disposed in a position below the grinding wheel 30 for proper engagement by the latter with one tooth 40. The correct positioning of each tooth 40 is accomplished by means of a longitudinal pawl 48 having a stop foot 49 on the inner end thereof, and which stop foot 49 bears against the back side of the tooth 40 to be sharpened.

At the outer or opposite end the longitudinal pawl 48 is pivotally connected to the upper end of a lever arm 50 which upstands from within the base 1, passing through a slot, as shown. At its lower end the lever arm 50 is pivoted, as at 51, being held against an adjustable stop screw 52 by a spring 53. By adjusting the screw 52, the stop foot 49 of the longitudinal pawl 48 can be preset to locate each tooth 40 of the saw chain 39 in proper position below the bringing wheel 30.

With the saw chain 39 engaged in the clamping device 38, with one of the teeth 40 in proper position below the grinding wheel 30, such tooth is sharpened—when the electric motor 28 is in operation—upon the operator grasping the outer end of the quadrant 20 and swinging the arm 11 downwardly to the limit of its movement as controlled by the stop screw 13.

In order to pre-set the grinding wheel so that it will cut a transverse bevel or angle on the tooth 40 in position to be sharpened, the unit comprised of said motor 28 and the grinding wheel 30 is adjusted about the bolt 33 as an axis, and in the manner previously described; the exact angle being ascertained by the pointer 36 which reads on the scale 21.

In order to pre-set the grinding wheel 30 to cut a longitudinal pitch or hook on the tooth 40 to be sharpened, the bracket 7 is adjusted by loosening the clamping bolt 6 and rotating the split collar 5 about the boss 4, and to such selective extent as may be desired, and which is determined by reading the pointer 10 on the scale 9.

It will be recognized that either one or both of the above adjustments can be made in the device before the sharpening operation is begun, and thereafter each tooth will be cut or sharpened to exactly the same configuration on the cutting edge.

When it is desired to use the device to sharpen a circular saw the clamping device 38, as shown in Figs. 1–3 inclusive, is removed, and which is accomplished by withdrawing the screw 45. Thereafter, the adapter, indicated generally at 54 and shown in Figs. 4 and 5, is applied to the front or face of the base 1. Such adapter 54 comprises a longitudinal arm 55 slotted lengthwise at its outer end, as at 56, and secured to the front of the base by a headed screw 57 which extends through such slot 56. From the headed screw 57 the longitudinal arm 55 extends inwardly to a substantially central point, and at its inner end said arm is formed with an inwardly projecting but outwardly opening cup 58 which is received in a recess 59 in the front of the base 1.

An integral stud 60 projects centrally out of the cup 58 and through the center hole of a circular saw blade 61 disposed vertically adjacent but outwardly of said front of the base. A centralizing cone 62 is carried on the stud 60 and enters the center hole of the circular saw blade 61; being urged thereinto by a finger nut 63 on the outer end portion of said stud. As so mounted, the circular saw blade 61 lies flush and tightly against the outer end of the cup 58.

That one of the teeth 64 of the circular blade 61 which is to be sharpened is properly located below the grinding wheel 30 before the finger nut 63 is tightened and by means of the structure which includes the longitudinal pawl 48 and stop foot 49 on its inner end; such stop foot 49 resting against the back side of said one tooth as shown in Fig. 4. Thereafter, the grinding wheel 30, which has been pre-set by proper adjustment to cut a desired transverse angle or longitudinal pitch, or both, is lowered in the same manner as previously described; i. e., by manually engaging the outer portion of the quadrant 20 and swinging the arm 11 downwardly until said grinding wheel 30 engages the tooth.

In Figs. 7–10 inclusive I have illustrated, in diagrammatic front elevation, several representative positions of adjustment of the device.

In Fig. 7 the device is set for sharpening a tooth of a saw chain so that both a transverse bevel and a longitudinal pitch are cut at the same time when the grinding wheel is lowered into tooth engagement, while in Fig. 8 the adjustment is merely for sharpening a transverse bevel on one of the teeth.

In Fig. 9 the device is shown as adjusted to sharpen and cut a longitudinal pitch on a tooth of a circular saw blade of rip type, while in Fig. 10 the adjustment is such as to sharpen and cut a transverse bevel on a tooth of a circular saw of cross cut type.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention as defined by the appended claims.

Having thus described the invention, the following is claimed as new and useful, and upon which Letters Patent are desired:

1. A saw sharpener comprising a base, means to releasably secure a saw on the base with a selected tooth upstanding thereabove, an electric motor and grinding wheel unit, and means mounting said unit in connection with the base for manual swinging motion between an initial raised position with the grinding wheel clear of such tooth and a lowered working position with the grinding wheel in sharpening engagement with said tooth; said last named means including a swing arm disposed above the base, one stop element depending from the swing arm toward the base, another and cooperating stop element on the base in initially spaced relation to said one stop element, and a spring between said stop elements yieldably resisting motion of one toward the other.

2. A saw sharpener, as in claim 1, in which the other stop element includes a hemispherical upper portion; the spring being helical and seating at the adjacent end on such upper portion of said other stop element.

3. A saw sharpener, as in claim 2, including means mounting the swing arm for adjustment about a horizontal axis, and said other stop element being in alinement with said axis.

4. A saw sharpener comprising a base, means to releasably clamp a saw on a forward portion of the base with a selected tooth upstanding above the top of said base, a swing arm above the base overhanging said forward portion and extending rearwardly therefrom, means mounting the swing arm at the rear in connection with the base for manual swinging motion between an initially raised position and a lowered position and for rotary adjustment of the arm about a horizontal axis extending transversely of the base, an electric motor and grinding wheel unit, and means mounting said unit on the swing arm for rotary adjustment of the unit about a vertical axis and with the grinding wheel rotatable in a plane extending generally lengthwise of said arm; the grinding wheel being clear of said tooth when the arm is in raised position and engaging the tooth in sharpening relation when the arm is in lowered position.

5. A saw sharpener, as in claim 4, including one stop element depending from the swing arm toward the base, another and cooperating stop element on the base, said stop elements being initially spaced but engaging upon predetermined downward motion of said arm, and a spring between the stop elements yieldably resisting motion of one toward the other.

6. A saw sharpener, as in claim 5, in which said other stop element includes a hemispherical upper portion, and the spring being helical and seating at the adjacent end on said hemispherical upper portion; said other stop element being substantially in alinement with the horizontal axis of rotary adjustment of said swing arm.

7. A saw sharpener comprising a base, means to releasably clamp a saw on a forward portion of the base with a selected tooth upstanding above the top of said base, a swing arm above the base overhanging said forward portion and extending rearwardly therefrom, a bracket upstanding from a rear portion of the base, means pivoting the swing arm at the rear on the bracket for manual motion between a raised position and a lowered position, means below the swing arm mounting the bracket on the base for rotary adjustment about a horizontal axis extending transversely of the base from the rear, an electric motor and grinding wheel unit, and means mounting the electric motor and grinding wheel unit below and in connection with the swing arm; the grinding wheel being rotatable in a plane extending transversely of said tooth and said last named means mounting such unit for limited adjustment about a vertical axis, the grinding wheel being clear of said tooth when the arm is in raised position and engaging the tooth in sharpening relation when the arm is in lowered position; the mounting means for the bracket including a horizontal boss projecting from the base, and a split collar on the bracket adjustably clamped on said boss.

8. A saw sharpener, as in claim 7, including a ring secured to the boss in front of the split collar, and a pointer on the ring; there being a scale on the bracket upon which said pointer reads.

9. A saw sharpener, as in claim 7, in which the swing arm includes a laterally projecting quadrant at the forward end portion, and the mounting means for the electric motor and grinding wheel unit includes a supporting arm extending transversely of the swing arm, the unit being secured to said supporting arm, one end of the latter being adjustable about said vertical axis, and the other end including a finger adjustably clamped to the quadrant; there being a pointer on the finger, and the quadrant having a scale on which the said pointer reads.

10. A saw sharpener, as in claim 7, in which the swing arm includes a laterally projecting quadrant at the forward portion, and the mounting means for the electric motor and grinding wheel unit includes a supporting arm extending transversely of the swing arm below the same and said quadrant, means pivotally suspending the supporting arm at its inner end from the swing arm for rotary adjustment about said vertical axis, the quadrant having an arcuate slot concentric to such vertical axis, an upwardly offset portion of the supporting arm extending upwardly through the slot, a finger on the top of said offset portion resting on the quadrant, and means adjustably clamping the finger to the quadrant; the electric motor and grinding wheel unit being attached to the supporting arm between its inner end and said offset portion.

11. A saw sharpener comprising a base, means to releasably secure a saw on the base with a selected tooth upstanding thereabove, an electric motor and grinding wheel unit, and means mounting said unit in connection with the base for manual swinging motion between an initial raised position with the grinding wheel clear of such tooth and a lowered working position with the grinding wheel in sharpening engagement with said tooth; the base having a front wall and said saw securing means including a clamping bar extending horizontally along said front wall, the bar being diametrally split from top to bottom, the saw being engaged in the split, a retention plate secured to the front wall and projecting upwardly in engagement with the outside of the clamping bar, and adjustable clamping means between the inner portion of the split bar and said retention plate.

12. A saw sharpener, as in claim 11, in which the clamping bar is circular in cross section, and said last named means comprises a headed clamping screw extending through the retention plate, turnably projecting through the outer portion of the bar, and threaded into the inner portion of the latter.

13. A saw sharpener, as in claim 12, in which the retention plate is formed with a vertical slot; the clamping screw being in said slot.

References Cited in the file of this patent
UNITED STATES PATENTS

| | | |
|---|---|---|
| 261,624 | Olney | July 25, 1882 |
| 352,802 | Blackmer | Nov. 16, 1886 |
| 410,444 | Radant | Sept. 3, 1889 |
| 472,865 | Drake | Apr. 12, 1892 |
| 1,508,588 | Black | Sept. 16, 1924 |
| 2,217,145 | Stihl | Oct. 8, 1940 |
| 2,462,225 | Roderick | Feb. 22, 1949 |
| 2,666,346 | Brown | Jan. 19, 1954 |
| 2,735,316 | Keck | Feb. 21, 1956 |